Aug. 17, 1948.   H. LEHDE   2,447,349
SHIP'S LOG INDICATOR
Filed Nov. 4, 1944
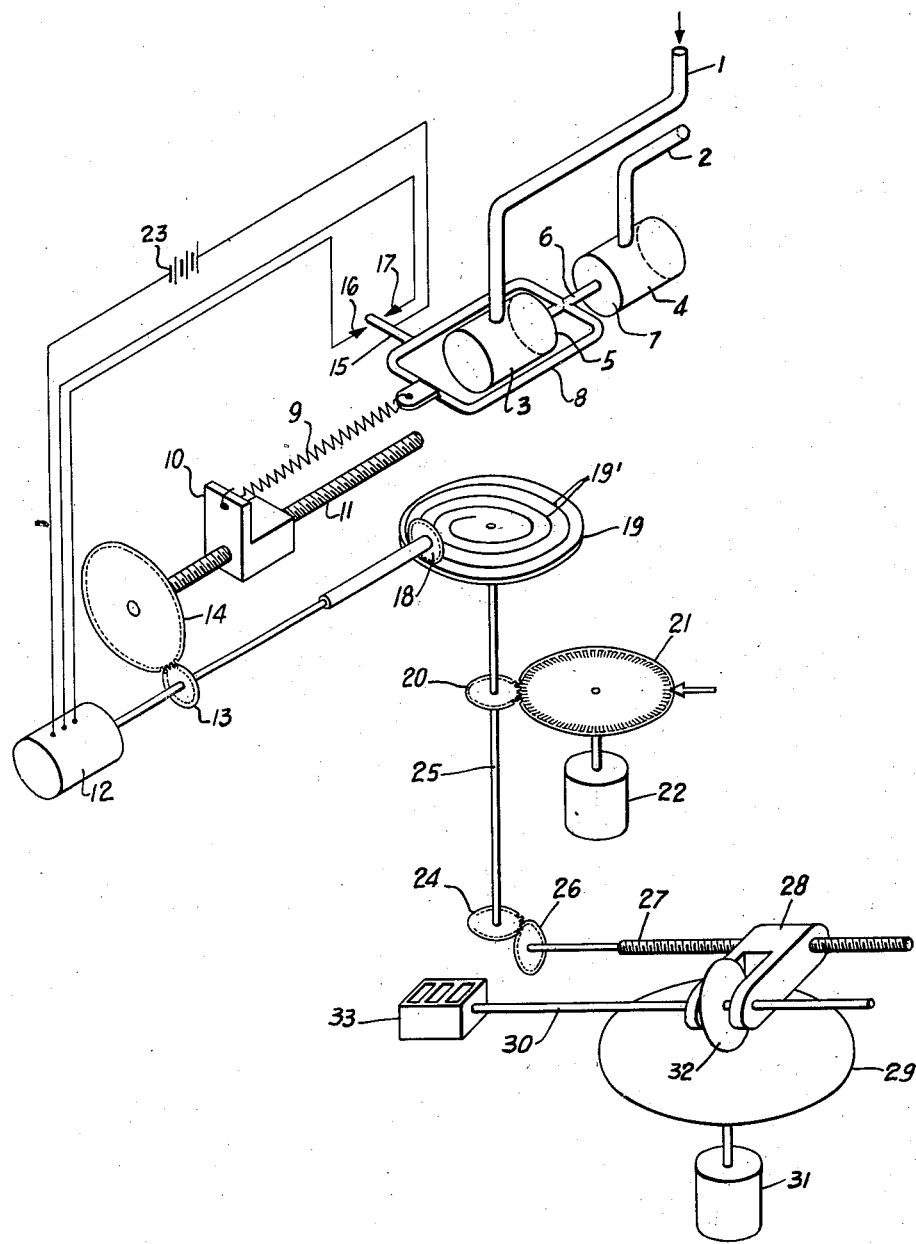
INVENTOR:
Henry Lehde,
BY
Edward L. Mueller
ATTORNEY Patented Aug. 17, 1948

2,447,349

UNITED STATES PATENT OFFICE 2,447,349

SHIP'S LOG INDICATOR

Henry Lehde, Brooklyn, N. Y., assignor to Control Instrument Company, Inc., Brooklyn, N. Y., a corporation of New York Application November 4, 1944, Serial No. 561,901

1 Claim. (Cl. 73—407)

The present invention relates to improvements in indicating devices such as may be employed on ships or on carriers relative to which a fluid moves, and has particular reference to a device of this character employing a Pitot tube.

Indicators of this type generally employ means for sensing the pressure developed by the Pitot tube and additional means for translating this pressure into a measurement of force such as an indication of the speed of travel of a ship. Many such devices developed for this purpose have used mercury columns or pressure balancing pumps and have been found cumbersome and unreliable in the accuracy of their indications.

In accordance with the present invention, it is proposed to provide an improved indicating device adapted, in a simple and direct manner, to obtain accurate readings of speed from Pitot tube pressure proportional to the square of the speed, by the employment of a reliable and inexpensive mechanical device including a movable member which will oppose the pressure of said tube and with which is associated a cam means for converting displacement of said member into speed indication.

The inventive idea involved is capable of receiving a variety of expressions one of which is shown in the accompanying drawing, but it is to be expressly understood that said drawing is employed only to illustrate the invention as a whole and not to define the limits thereof, reference being had to the appended claims for this purpose.

In the drawing the figure is a schematic diagram illustrating the arrangement of the parts of an indicating device embodying the characteristic features of the present invention.

Referring more particularly to the drawing, the numerals 1 and 2 indicate, respectively, the dynamic and static branches of a Pitot tube, which is utilized to develop the pressure employed for controlling the instrumentalities by which said pressure is converted into terms of speed and distance indication. As customary, said tube 1 is located under water with its open end pointed in the direction of travel of the ship so that it develops a pressure dependent upon the depth to which it is submerged and the speed of the vessel, while the tube 2 is positioned at right angles to said direction and develops a static pressure dependent only upon the depth of its submergence.

According to the invention, two pressure cylinders 3 and 4 are arranged in opposed relation, with the branch 1 of the Pitot tube connected to the cylinder 3 and the branch 2 joined to said cylinder 4. Adjacent ends of the cylinders are provided respectively, with diaphragms 5 and 7 responsive to internal and opposing pressures within said cylinders. A rod 6 connects said diaphragms so that it will be moved by the resultant force created by the opposing pressures in the cylinders, which force will be due only to the speed of the ship. Intermediate its ends, the rod 6 is joined to one end of a substantially rectangular frame 8 surrounding the cylinder 3 and connected at its other end to one extremity of a tension spring 9 which exerts a pull upon said frame in opposition to the resultant force produced by the diaphragms 5 and 7. A follower nut 10 mounted on the threaded shaft 11 is connected to the other end of said spring 9 and the linear displacement and consequent force exerted by the latter is determined by the position of said nut 10 on its shaft. Rotation of said shaft in either direction is accomplished by a reversible motor 12, the shaft of which carries a small gear 13 meshing with a larger gear 14 on the end of the shaft 11.

The frame 8 carries a contact arm 15 movable therewith so as to engage either one of two stationary contacts 16 or 17 and said arm 15 assumes the neutral position shown in the drawing when, for example, the speed of a ship is zero or constant, said neutral condition being created by balanced pressures within the cylinders 3 and 4 when the speed is zero, or by the action of the spring 9 against the resultant diaphragm pressure when said speed is constant. From this it will be apparent that any alteration in speed which will cause the spring 9 to exert a force greater or less than the resultant diaphragm pressure, the frame 8 will move and engage its arm 15 with one or the other of the contacts 16 or 17, thereby establishing an energizing circuit, through the battery 23, for the reversible motor 12. The shaft 11 is thus rotated accordingly to shift the follower nut 10 therealong until the tension of the spring 9 and the resultant diaphragm pressure equalize, whereupon the arm 15 restores to neutral and the motor 12 stops.

A pinion 18 telescopically mounted on the shaft of the motor 12 is geared to a cam element which may take the form of a rotatable disc 19 having gear teeth 19' on its face forming a spiral track thereon of uniformly increasing radius from its center. The arrangement is such that the rotation of the disc, under the infleunce of the pinion 18 meshing with the teeth 19', is equal to the square root of the pinion rotation. Therefore, said disc rotation is proportional to the square root of the tension exerted by the spring 9 or the resultant diaphragm pressure, and is equal to ship speed. As the disc 19 rotates, a pinion 20 on its shaft 25 drives the linear speed scale 21 and the electrical transmitter 22 to indicate and transmit values of ship speed.

A distance integrating mechanism may be coupled to the shaft 25 by means of a bevel gear 24 thereon meshing with a similar gear 26 on one end of a threaded shaft 27 which carries a follower nut 28. Said mechanism further comprises a disc 29 driven by a constant speed motor 31 and engages on its upper surface by a friction wheel 32 splined on the shaft 30 and movable with the follower nut 28 when the latter is shifted along the shaft 27 by rotation of the latter in either direction under the influence of the shaft 25. When ship speed is zero, the wheel 32 engages the center of the disc 29 and the shaft 30 will not be driven to operate the counter 33 to which it is connected. However, when the ship gets under way and thereafter increases or decreases speed, causing temporary unbalance in the pressures of the cylinders 3 and 4 and consequent operation of the reversible motor 12, the disc 19 will be rotated in one direction or the other and, through its shaft 25, will shift the follower nut 28 and wheel 32 so that the latter moves to some position off-center with respect to the disc 29 to drive the shaft 30 and counter 33, and the latter will indicate the distance traveled. Thus, as the wheel 32 is moved in accordance with variations in ship speed, its rotation will be the time integral of said speed or the distance traveled.

What is claimed is:

An indicating device, comprising, in combination, two opposed pressure cylinders having elements movable in response to pressures, a linearly movable frame embracing one of said cylinders and having a portion connecting said elements so as to be movable therewith in response to a differential in pressure within said cylinders, said frame further having a contact movable therewith, a reversible motor and circuit therefor including said contact, a screw shaft driven by said motor, a follower on said shaft, a spring connecting said follower and frame in alignment with the portion of the latter connecting said cylinders, and indicating means operated by said motor.

HENRY LEHDE.

REFERENCES CITED

The following references are of record in the file of this patent:

UNITED STATES PATENTS

| Number | Name | Date |
|---|---|---|
| 1,052,387 | Star | Feb. 4, 1913 |
| 1,096,883 | Alger | May 19, 1914 |
| 1,202,052 | Gibson | Oct. 24, 1916 |
| 1,296,947 | Blot-Garnier | Mar. 11, 1919 |
| 1,968,539 | Rydberg | July 31, 1934 |
| 2,107,976 | Blasig | Feb. 8, 1938 |
| 2,131,486 | Spitzglass | Sept. 27, 1938 |
| 2,212,085 | Tate | Aug. 20, 1940 |
| 2,380,177 | Hicks | July 10, 1945 |

FOREIGN PATENTS

| Number | Country | Date |
|---|---|---|
| 248,384 | Great Britain | May 25, 1927 |